United States Patent [19]

Jackson

[11] 4,372,421
[45] Feb. 8, 1983

[54] VEHICLE EXHAUST SYSTEM

[76] Inventor: Otis Jackson, 13284 Caldwell, Detroit, Mich. 48212

[21] Appl. No.: 58,860

[22] Filed: Jul. 19, 1979

Related U.S. Application Data

[63] Continuation-in-part of Ser. No. 597,082, Jul. 18, 1975, abandoned.

[51] Int. Cl.³ .............................. F01N 1/24; F01N 7/18
[52] U.S. Cl. .................................... 181/243; 181/256; 181/258; 181/272
[58] Field of Search ............... 181/231, 240, 241, 228, 181/256, 258, 264, 265, 269, 272, 275, 252, 251, 248, 222, 243; 55/DIG. 30, 276, 325

[56] References Cited

U.S. PATENT DOCUMENTS

| | | | |
|---|---|---|---|
| 2,826,261 | 3/1958 | Eckel | 181/42 |
| 2,914,132 | 11/1959 | Bourne et al. | 181/42 |
| 3,147,097 | 9/1964 | Aguas | 181/42 |
| 3,224,171 | 12/1965 | Bowman | 55/276 |
| 3,243,010 | 3/1966 | Flynn | 181/256 |
| 3,350,878 | 11/1967 | Lambert | 60/303 |
| 3,478,689 | 10/1969 | Gurr | 55/325 |
| 3,491,850 | 1/1970 | Heitner | 181/53 |
| 3,511,617 | 5/1970 | Lyben | 181/251 |
| 3,521,429 | 7/1970 | Leffler | 181/42 |
| 3,563,338 | 2/1971 | Rader | 181/256 X |
| 3,710,891 | 1/1973 | Flugger | 181/256 |
| 3,712,029 | 1/1973 | Charlton | 60/297 |
| 3,754,619 | 8/1973 | McCormick | 181/248 |
| 3,769,799 | 11/1973 | Culp | 60/303 |
| 4,032,310 | 6/1977 | Ignoffo | 55/276 |

*Primary Examiner*—Benjamin R. Fuller
*Attorney, Agent, or Firm*—Basile, Weintraub & Hanlon

[57] ABSTRACT

An exhaust system for a vehicle includes an afterburner in communication with the exhaust manifold of the engine on the inlet side of the afterburner. The outlet port of the afterburner communicates with a muffler of unique construction which, in turn, communicates with a resonator. The system thereof provides reduced particulate solids in the exhaust fumes.

2 Claims, 5 Drawing Figures

VEHICLE EXHAUST SYSTEM

CROSS-REFERENCE TO CO-PENDING APPLICATIONS

This application is a continuation-in-part of co-pending application, Ser. No. 597,082, filed July 18, 1975, now abandoned, in the name of Otis Jackson.

BACKGROUND OF THE INVENTION

1. Field of the Invention

The present invention pertains to exhaust systems. More particularly, the present invention relates to vehicular exhaust systems. Even more particularly, the present invention pertains to vehicluar exhaust systems including an afterburner and a muffler.

2. Prior Art

Because of modern-day regulations pertaining to emission controls, various systems have been devised for reducing air pollutants issuing from vehicle exhaust systems. One of the more recent developments has been the anti-smog devices, such as the vapor cannister, which recirculate unspent fuels to the carburetor. However, the efficiency of the engine and the gasoline mileage is adversely affected by such systems. Furthermore, the amount of contaminants issuing into the air is not greatly alleviated.

Today, the art now deploys catalytic converter systems in vehicle exhaust lines. Such catalytic converters, while greatly reducing the amount of gaseous contaminants issuing from the exhaust systems, are quite costly. This is due to the platinum bases which are used within the mufflers employing such catalytic converters. Furthermore, such converters have proven effective only at reducing gaseous emissions, such as hydrocarbons, carbon monoxide and nitrious oxides. It has been found that there is a tendency for sulphur and other particulates to be emitted into the air from the exhaust system of vehicle employing catalytic converters. This release of particulates into the environment is coming under increased scrutiny and possible governmental regulations in an effort to improve the air quality of urban areas.

Thus, a major advance in the art would be provided by an improved exhaust system which overcomes the deficiencies attendant modern-day vehicluar exhaust systems and emission control devices. It is to this end to which the present invention is directed.

SUMMARY OF THE INVENTION

In accordance with the present invention, a vehicular exhaust system includes an afterburner interposed between the exhaust manifold and the muffler. The afterburner includes a spark plug to burn the exhaust gases and cooperates with a nichrome wire, which generates heat within the chamber of the afterburner, to further combust the exhaust gases. The by-products from the afterburner are then exhausted to the muffler. From the muffler, the gases are transmitted to a resonator and therefrom to the atmosphere.

The muffler includes means for circulating the exhaust therein such that the exhaust is in contact with a mass of sound deadening material disposed in a first portion of the housing and a mass of wire mesh in a second portion thereof before being exhausted through an empty third section to the resonator.

The resonator has a construction analgous to that of the muffler in that the exhaust gases flow through sound deadening material and wire mesh before being exhausted to the atmosphere. The exhaust emissions issuing from the present system have reduced particulates contained therein.

BRIEF DESCRIPTION OF THE DRAWING

For a more complete understanding of the present invention, reference is made to the following detailed description and accompanying drawing. In the drawing, like reference characters refer to like parts throughout the several views in which.

DESCRIPTION OF THE PREFERRED EMBODIMENTS

Figure 1:
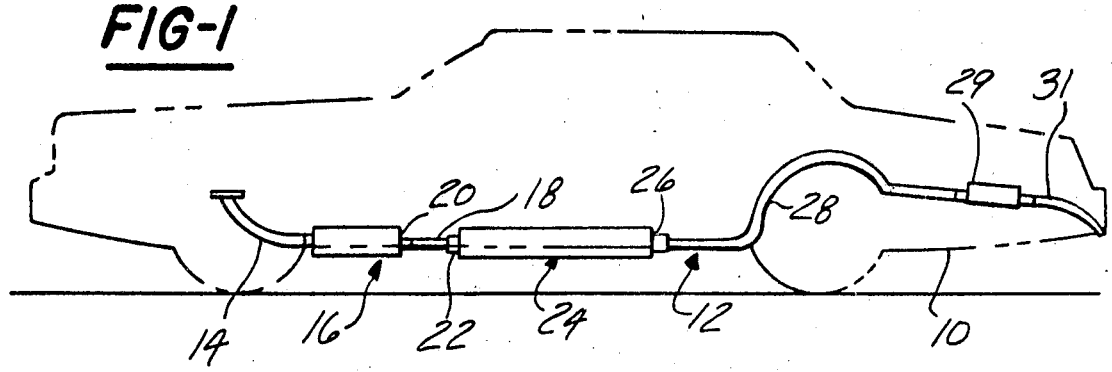
FIG. 1 is a side elevational view depicting the deployment of the exhaust system of the present invention.
Figure 2:
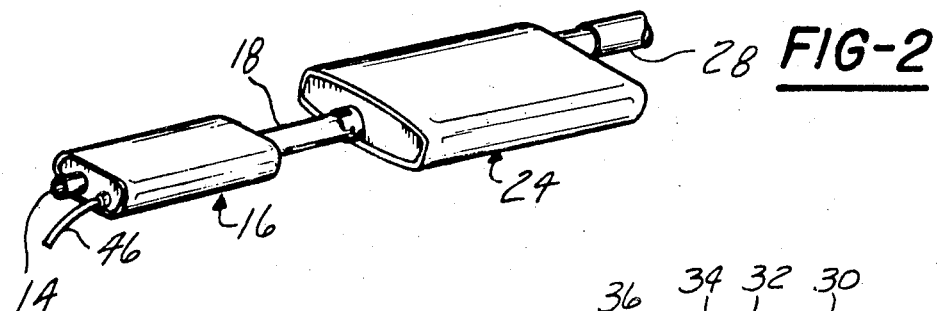
FIG. 2 is a perspective view depicting the afterburner and muffler of the present invention.
Figure 3:
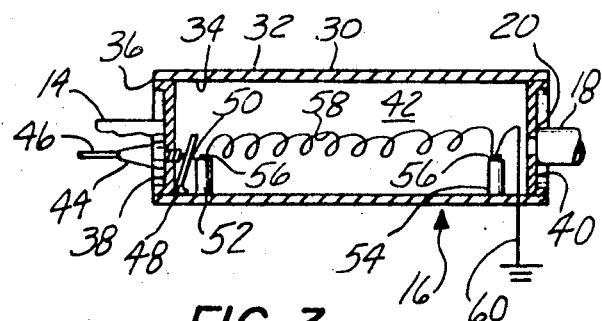
FIG. 3 is a cross sectional view of the afterburner employed in the practice of the present invention.

Now, with reference to the drawing, and in particular FIG. 1, there is shown a vehicle 10 having an exhaust system, generally indicated at 12. The exhaust system includes a conduit 14 extending from the exhaust manifold, not shown, to an afterburner, generally indicated at 16. The conduit 14 extends between the exhaust manifold and the inlet side of the afterburner 16. A conduit 18 extends between the outlet 20 of the afterburner and the inlet 22 of a muffler, generally indicated at 24. An outlet 26 of the muffler 24 is connected to an exhaust pipe generally indicated at 28. The exhaust pipe 28, in turn, communicates with a resonator, generally indicated at 29. A conduit 31 extends from the resonator and opens to the atmosphere.

It is to be understood, that with reference to the present invention, the automobile 10 is of standard construction and includes an internal combustion engine having an exhaust manifold through which the exhaust gases are exhausted to the atmosphere. Further, the conduits which provide the communication between the afterburner, the muffler, the resonator and the atmosphere are, also, of standard construction and well-known to the skilled artisan. In addition, a catalytic converter, not shown, of conventional construction may be employed in the exhaust system to remove substantial quantities of the gaseous emissions from the engine.

Referring now to FIGS. 2-5, there is depicted therein, the afterburner 16, muffler 24 and resonator 29 of the present invention. The afterburner 16 includes a steel housing 30 having an outer wall 32 and an inner wall 34. Interposed between the walls 32 and 34 is an asbestos lining 36 which completely surrounds the afterburner. The afterburner further includes a first side wall 38 and a second side wall 40. The two side walls are spaced apart and cooperate with the housing 30 to define an interior chamber 42. Mounted on the first side wall 38 is a spark plug 44. The spark plug has a lead wire 46 which extends to the ignition switch of the vehicle (not shown). A contact plate 48 is mounted in the chamber 42 proximate to and in contact with the spark plug 44.

Mounted on the housing 30 is a pair of support posts 52, and 54. The support posts are affixed to the housing 30 by any suitable means. Each of the support posts includes a threaded connector 56 or the like, which extends through the support posts as shown. The two support posts 52 and 54 are spaced apart along the longitudinal extent of the housing. Extending between the two support posts is a Nichrome wire 58. The ends of the Nichrome wire are secured to the support posts via the threaded connectors 56. Extending from the support post 52 and its associated threaded connector 56 is a lead wire 50 which is connected at its other end, to the contact plate 48. Thus, a constant flow of electrical energy is transmitted from the vehicle ignition through the lead wire 46, spark plug 44 and contact plate 50 to the Nichrome wire 58. A ground wire 60 extends from the support post 54 to a suitable ground such as the oil pan (not shown). In accordance herewith, the Nichrome wire 58 is adapted to generate a three ohm resistance to generate heat within the chamber 42. The spark plug 44 is connected for continuous flow of electrical currents which further ignites the exhaust gases issuing through the exhaust manifold of the engine. Thus, in accordance herewith, the conduit 14 opens into the interior of the housing 30, i.e., the chamber 42, wherein the heat from the wire and the spark plug cooperate to further combust and break down the exhaust emissions into basic elements, such as carbon dioxide and the like.

The exhaust gases within the chamber 42 are exhausted through outlet 20 and into conduit 18. From the conduit 18 the exhaust gases travel to inlet 22 associated with the muffler 24 hereof.

Figure 4:
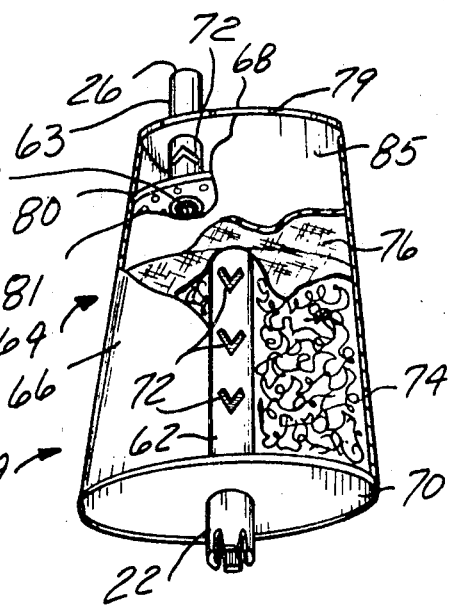
FIG. 4 is a cut-away, perspective view of the muffler employed in the practice of the present invention.

The muffler 24 includes an inlet 22 and an outlet 26, as hereinbefore noted. The inlet and outlet comprise an inlet conduit 62 and an outlet conduit 63. As shown in FIG. 4 the inlet and outlet conduits 62 and 63 may be offset from each othere relative to the longitudinal centerline of the muffler 24 to allow for different vehicle exhaust system configurations. Enveloping the inlet and outlet conduits 62 and 63 in the central portion thereof is an outer steel casing or housing 64. The housing includes a cylindrical or elliptical wall 66 and end walls 68 and 70 in the well-known manner. The casing 64 is integrally formed with the conduits 62 and 63. As clearly shown in FIG. 4, the conduits 62 and 63 have that portion thereof which is disposed within the casing provided with a plurality of baffles 72. The baffles 72 permit the exhaust gases travelling through the conduits 62 and 63 to exit therefrom into the interior of the casing 64.

Disposed within the interior of the casing 64 and surrounding the inlet conduit 62 is a mass of sound deadening material 74, such as fiberglass. The sound deadening material is utilized in sufficient thickness to fill substantially all of the interior of the casing 64. The fiberglass 74 is held in position and in contact with the inlet conduit 62 by an outer layer of wire mesh 76. The portion of the interior of the casing 64 having the sound deadening material 74 disposed therein thus comprises a first interior section of the muffler 24.

Adjacent the insulating material 74 which defines the first section of the interior of the muffler is a second section of the interior. The second section is comprised of a plurality of turns of fine wire mesh 76 which are disposed within the interior of the casing 64. Thus, the gases which exit from the first portion of the casing come into contact with the wire mesh 76 in the second portion thereof.

A perforated plate 80 is disposed at the rearward end of the second section of the interior of the muffler 24. The plate 80 includes a plurality of apertures or openings 81 which permit exhaust gases to flow from the second interior section into the third section. The third section defines an air space within the muffler 24. A larger aperture 83 is also formed in the plate 80 which receives one end of the outlet conduit 26 and defines a fluid flow path between the outlet conduit 26 and the second interior section of the casing.

Both the second and third sections of the interior of the muffler 24 are surrounded with a fiberglass mat 85 for sound insulation.

Because the muffler 24 is sealed, the gases must exit through the exhaust port 26 which is at the exterior of the end wall 68. The last baffle 72 within the outlet conduit 63 defines the means for the gases circulating therewithin to re-enter the outlet conduit 63 and to exit through the exhaust port 26.

The insulation 74 and wire mesh 76 define a removable module or cartridge that can be easily removed from the muffler 24 and replaced with a fresh cartridge to prevent clogging of the insulation and wire mesh with particulates. The removable feature is achieved by providing a plurality of fasteners, such as bolts 79, which connect one end wall of the casing 64, such as rear end wall 68, to the cylindrical wall 66. Thus, the bolts 79, can be detached, thereby permitting the end wall 68 to be removed. A hook or other insertion means may then be inserted into the muffler 24 to grasp the material therein and permit removal of the wire mesh 76 and the insulation 74. Reversal of this procedure enables fresh components to be re-inserted into the muffler 24.

As hereinbefore noted, the exhaust port 26 is connected to an exhaust pipe 28 which then transmits the gases to the resonator 29.

Figure 5:
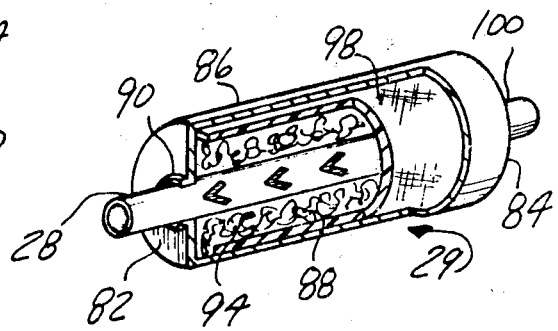
FIG. 5 is a cut-away, perspective view of the resonator employed in the practice of the present invention.

The resonator 29 is constructed in a manner analogous to that of the muffler 24. As shown in FIG. 5, the resonator generally includes a pair of spaced apart end walls 82 and 84 and a substantially cylindrical side wall 86 integrally formed therewith. The walls cooperate to define an open interior 88. The end wall 82 is provided with an opening 90 which defines an inlet for the exhaust pipe 28. The exhaust pipe 28 is baffled along the extent thereof in the manner heretofore described with respect to the muffler 24.

The interior of the resonator 29 is segregated into two sections. The first section is defined by a fiberglass packing or mat 94 which surrounds the conduit 28.

The second section of the interior 88 of the resonator 29 comprises a wire mesh or screen 98. The wire mesh 98 surrounds the fiberglass mat 94. It is to be appreciated that as exhaust gases enter the conduit 28 they are circulated through the interior 88 by virtue of the baffles. The last baffle serves as an exit through the conduit 28 for the gases circulating within the interior 88.

The resonator 29 further includes an outlet 100 which is defined by an opening in the end wall 84. The conduit 28 is connected to or otherwise joined with the exhaust conduit, not shown, at the outlet 100. The opposite end of the exhaust conduit opens to the atmosphere.

It has been found that by the practice of the present invention, that the particulates within the exhaust gases of an internal combustion engine are greatly reduced. This is clearly evidenced by the following table which depicts particulate emissions from two vehicles in both hot and cold start modes.

| PARTICULATE EMISSIONS (gm/mile) | | | |
|---|---|---|---|
| Standard Muffler | | New Muffler | |
| hot portion | cold start portion | hot portion | cold start portion |
| Car #1   0.009 | 0.055 | 0.0003 | 0.012 |
| Car #2 | | | |
| test 1 | | 0.034 | |
| test 2 | | 0.057 | 0.102 |
| test 3 | | 0.028 | 0.090 |

As shown in the above table, particularly with regard to car #1, a significant reduction in the particulate emissions can be achieved with the present system. As seen therein, a reduction of 97% in hot portion particulates can be realized through the use of a muffler constructed according to the teachings of this invention.

Having thus described the invention, what is claimed is:

1. A muffler for a vehicle exhaust system comprising:
   a housing having an inlet and outlet and first, second and third interior portions formed therein;
   an inlet conduit disposed in said inlet of said housing, said inlet conduit extending a distance into said first portion of said housing, said inlet conduit having a plurality of baffles along its extent thereof defining a fluid flow path through said inlet conduit into said first portion of said housing;
   a mass of sound deadening material disposed in said first portion of said housing surrounding said inlet conduit;
   a layer of wire mesh surrounding said mass of sound deadening material;
   a mass of wire mesh disposed adjacent to said mass of sound deadening material in said second portion of said housing and substantially filling said second portion of said housing;
   a layer of sound deadening material disposed within said housing and surrounding said second and third portions;
   partition means disposed between the second and third portions of the housing, said partition means having a first aperture and a plurality of second apertures disposing said third portion of said housing in fluid flow communication with said second portion of said housing;
   an outlet conduit extending a distance into said third portion of said housing adjacent to said second portion therein and received in said first aperture in said partition means to define a fluid flow path between said second portion of said housing and said outlet conduit, said outlet conduit having a baffle therein defining a fluid flow path between said third portion of said housing and said outlet conduit; and wherein
   one end of said housing is detachably secured thereto and further wherein the mass of sound deadening material and the mass of wire mesh are removable from the interior of said housing.

2. The muffler of claim 1 wherein the inlet and outlet openings in the housing are laterally offset with respect to each other.

* * * * *